(12) United States Patent
Li

(10) Patent No.: US 7,973,862 B2
(45) Date of Patent: Jul. 5, 2011

(54) TELEVISION CAPABLE OF PERFORMING REMINDER FUNCTION

(75) Inventor: Hung-Yuan Li, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 1316 days.

(21) Appl. No.: 11/527,384

(22) Filed: Sep. 27, 2006

(65) Prior Publication Data

US 2007/0069917 A1    Mar. 29, 2007

(30) Foreign Application Priority Data

Sep. 29, 2005  (TW) ............................... 94133987 A

(51) Int. Cl.
  *H04N 5/44*  (2006.01)
  *H04N 5/50*  (2006.01)
  *H04N 5/445*  (2006.01)

(52) U.S. Cl. ......... 348/734; 348/725; 348/569; 348/563

(58) Field of Classification Search ................. 348/725, 348/728, 734, 736, 738, 569, 570, 563–565; 340/825.24, 825.25, 309.7, 7.2; 725/58; *H04N 5/44, H04N 5/60, 5/50, 5/445*
See application file for complete search history.

(56) References Cited

U.S. PATENT DOCUMENTS

| 6,388,715 B1 * | 5/2002 | Eggen et al. ................. 348/569 |
| 2007/0291175 A1 * | 12/2007 | Hsieh ............................ 348/565 |

FOREIGN PATENT DOCUMENTS

| CN | 1202779 A | 12/1998 |
| CN | 2447893 Y | 9/2001 |
| TW | 200506826 A1 | 2/2005 |
| TW | M262748 A1 | 4/2005 |

* cited by examiner

*Primary Examiner* — Sherrie Hsia
(74) *Attorney, Agent, or Firm* — Winston Hsu; Scott Margo

(57) ABSTRACT

A television capable of performing a reminder function is disclosed. The television includes a reminder sound displaying unit and a processor. The processor is electrically connected to the reminder sound displaying unit. The processor is responsible for determining whether a reminder time is reached or not. After the reminder time is reached, the processor controls the reminder sound displaying unit to generate a reminder sound.

9 Claims, 3 Drawing Sheets

TELEVISION CAPABLE OF PERFORMING REMINDER FUNCTION

BACKGROUND OF THE INVENTION

1. Field of the Invention

The present invention relates to televisions (TVs), and more particularly, to a TV capable of performing a reminder function.

2. Description of the Prior Art

A television (TV) is a kind of electronic device that can be used to display audio and video data received from various types of sources. Some conventional TVs are capable of performing a reminder function. By using the remote control of a TV of this kind, the TV user is able to select a planned chore from a chore list preset in the TV. The user can also set a reminder time corresponding to the selected planned chore. After the reminder time set by the user is reached, the TV will display a reminder text corresponding to the selected planned chore on the TV screen.

If, however, the user is preoccupied with other matters, such as reading, or if they need to leave their seat for a short time, they will miss the visual message displayed on the screen. Therefore, the reminder message function is ineffective.

Furthermore, in a conventional TV capable of performing the reminder function, the number of selectable chores preset in the TV is always limited. These chores are determined by the TV designers and stored in the TV in advance. They may not always encompass all possible chores the user requires, and the user interface of the TV is not complex enough to allow the user to personally input information for a specific chore.

SUMMARY OF THE INVENTION

According to the claimed invention, a TV capable of performing a reminder function is disclosed. The TV comprises a reminder sound displaying unit and a processor, where the processor is electrically connected to the reminder sound displaying unit. The processor is responsible for determining whether a reminder time corresponding to a setting value has been reached. Once the reminder time is reached, the processor controls the reminder sound displaying unit to generate a reminder sound.

According to the claimed invention, a TV capable of performing a reminder function is disclosed. The TV comprises a video displaying unit, an audio recording unit, and a processor. The video displaying unit displays a program video. The audio recording unit records a reminder sound to generate recorded audio data. The processor is electrically connected to the video displaying unit and the audio recording unit, and is responsible for performing voice-recognition on the recorded audio data to generate corresponding textual data. The processor further controls the video displaying unit to display reminder text corresponding to the textual data once a reminder time, corresponding to a setting value, is reached.

According to the claimed invention, a TV capable of performing a reminder function is disclosed. The TV comprises a video displaying unit, a processor, a receiving interface, and a remote control. The video displaying unit displays a program video. The processor is electrically connected to the video displaying unit, and is responsible for performing voice-recognition on recorded audio data to generate corresponding textual data. The processor further controls the video displaying unit to display reminder text corresponding to the textual data once a reminder time corresponding to a setting value is reached. The receiving interface is electrically connected to the processor, and is responsible for receiving the recorded audio data and the setting value from the remote control. The remote control is coupled to the receiving interface. The remote control comprises an audio recording unit for recording a reminder sound to generate the recorded audio data. In addition, the remote control further generates the setting value and sends the recorded audio data and the setting value to the receiving interface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
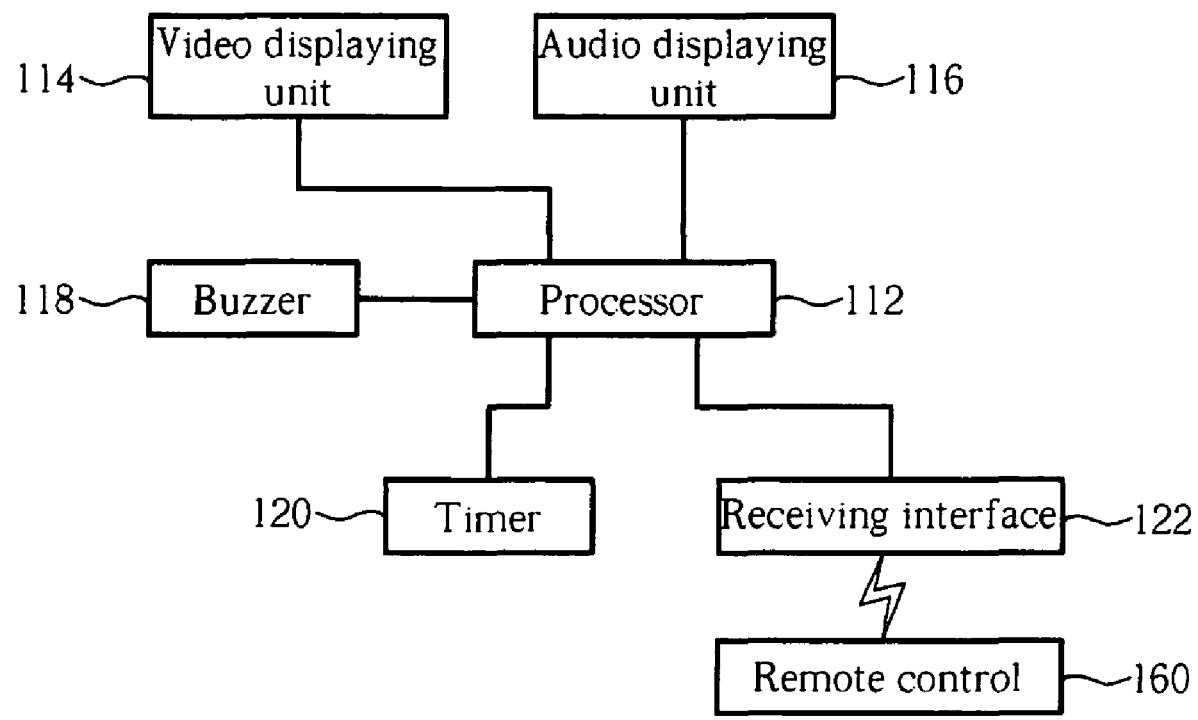
FIG. 1 shows a TV according to a first embodiment of the present invention.

FIG. 1 shows a TV 100 according to a first embodiment of the present invention. In this embodiment, the TV 100 comprises a processor 112, a video displaying unit 114, an audio displaying unit 116, a buzzer 118, a timer 120, a receiving interface 122, and a remote control 160. The processor 112, which is electrically connected to the buzzer 118, is a unit that controls the operations of the interior components of the TV 100. The video displaying unit 114 is for displaying a program video. The audio displaying unit 116 is for generating a program sound. The buzzer 118 can be viewed as a reminder sound displaying unit of the TV 100. The remote control 160 allows a user of the TV 100 to perform basic control operations, such as power on, power off, channel switching, and volume adjustment. In addition, the remote control 160 further allows the user to set a reminder time. The reminder time indicates a scheduled time when a planned chore should be performed by the user. The remote control 160 converts the reminder time inputted by the user into a setting value, and then sends the setting value to the receiving interface 122.

The setting value received by the receiving interface 122 enables the processor 112 to determine the reminder time, and by utilizing the timer 120, the processor 112 can determine when the reminder time has been reached. Before the reminder time is reached, the TV 100 performs ordinary Audio/Video displaying functions, i.e. it operates as a conventional TV. Once the reminder time is reached, the processor 112 will control the buzzer 118 (which constitutes a reminder sound displaying unit of the TV 100) to generate a reminder sound (such as a buzzer sound), as well as controlling the TV 100 to continue performing the ordinary Audio/Video displaying functions. Once the TV 100 user hears the buzzer sound, the goal of reminding the user has been achieved.

Figure 2:
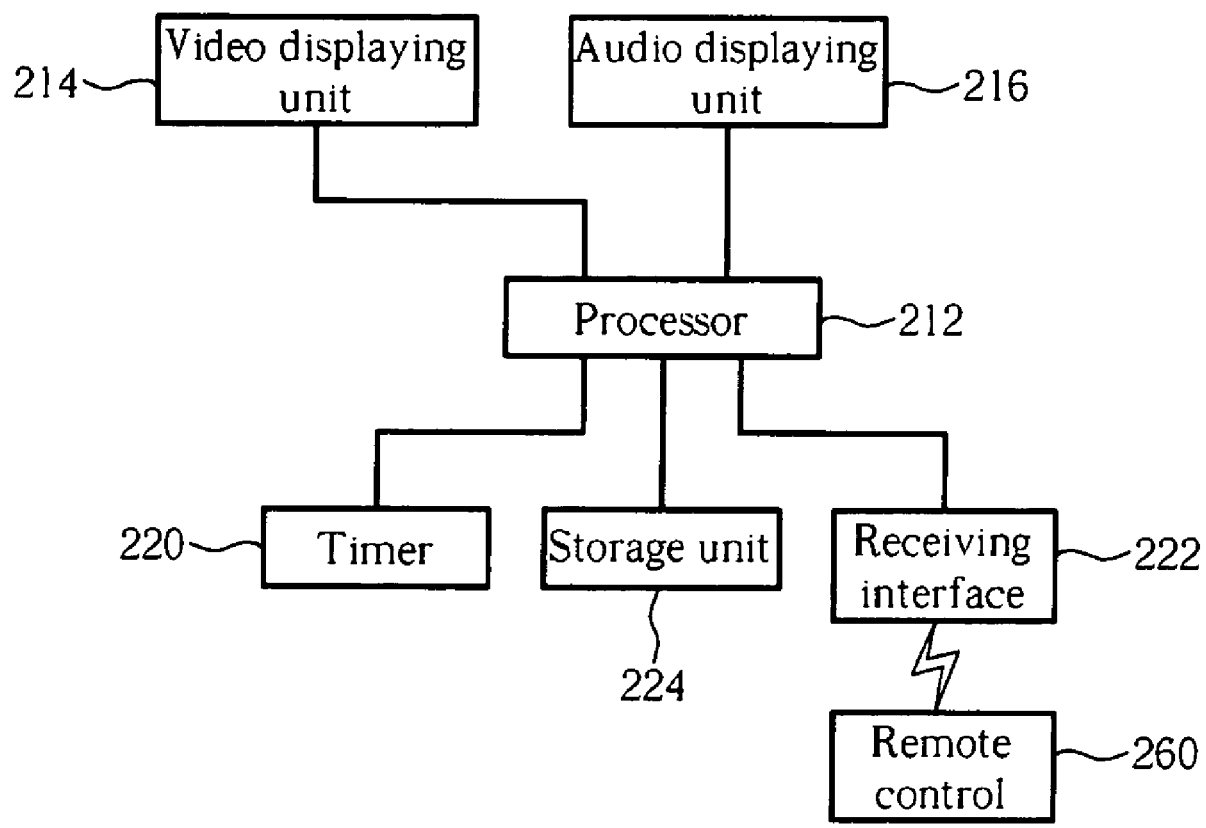
FIG. 2 shows a TV according to a second embodiment of the present invention.

FIG. 2 shows a TV 200 according to a second embodiment of the present invention. Similar to the first embodiment, in the second embodiment the TV 200 comprises a processor 212, a video displaying unit 214, an audio displaying unit 216, a timer 220, a receiving interface 222, and a remote control 260. The functions of these components are respectively similar to that of the processor 112, the video displaying unit 114, the audio displaying unit 116, the timer 120, the receiving interface 122, and the remote control 160 of the first embodiment. In addition, the TV 200 further comprises a storage unit 224, which can be implemented by a memory, a hard disc, a re-writable disc, or other kinds of storage devices. The storage unit 224 is utilized to store at least one voice data candidate. By utilizing the remote control 260, the user can set a reminder time of a planned chore. The remote control 260 converts the reminder time into a setting value, and sends the setting value to the receiving interface 222. Additionally, the user can select one voice data candidate from the voice data candidates stored in the storage unit 224 as default audio data by utilizing the remote control 260. In this embodiment, at least one speaker of the audio displaying unit 216 has dual roles. More specifically, before the reminder time is reached, the processor 212 controls at least one speaker to generate a program sound. Once the reminder time is reached, the processor 212 controls the speaker to stop generating the program sound and to start generating a reminder sound according to the default audio data. In this situation, the speaker can be viewed as a reminder sound displaying unit of the TV 200. Once the TV 200 user hears the reminder sound, the goal of reminding the user has been achieved.

Figure 3:
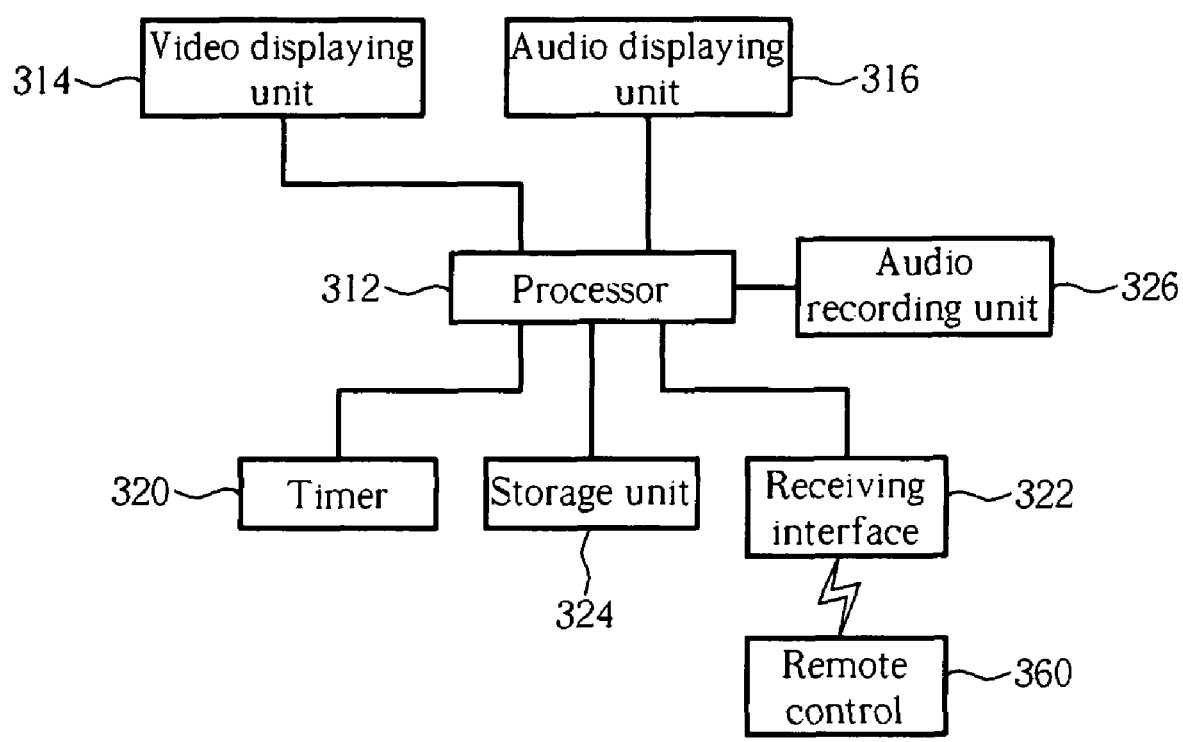
FIG. 3 shows a TV according to a third embodiment of the present invention.

FIG. 3 shows a TV 300 according to a third embodiment of the present invention. Similar to the second embodiment, in the third embodiment the TV 300 comprises a processor 312, a video displaying unit 314, an audio displaying unit 316, a timer 320, a receiving interface 322, a storage unit 324, and a remote control 360. The functions of these components are respectively similar to that of the processor 212, the video displaying unit 214, the audio displaying unit 216, the timer 220, the receiving interface 222, the storage unit 224, and the remote control 260 of the second embodiment. In addition, the TV 300 further comprises an audio recording unit 326, which may consist of an analog-to-digital converter built inside the TV 300 and an externally connected microphone. The audio recording unit 326 is responsible for recording a reminder sound and generating corresponding recorded audio data. The recorded audio data is then stored in the storage unit 324. In this embodiment, at least one speaker of the audio displaying unit 316 has dual roles. More specifically, before the reminder time is reached, the processor 312 controls at least one speaker to generate a program sound. Once the reminder time is reached, the processor 312 controls the speaker to stop generating the program sound and to start generating the reminder sound according to the recorded audio data stored in the storage unit 324. In this situation the speaker can be viewed as a reminder sound displaying unit of the TV 300. Once the TV 300 user hears the reminder sound, the goal of reminding the user has been achieved.

Please note that "using a reminder sound to remind a user" constitutes a characteristic of the third embodiment. In addition, in this embodiment the user is allowed to use the audio recording unit 326 to record the reminder sound. Therefore the reminder sound may specifically detail what kind of chore the user has already planned to do at the reminder time. Furthermore, even when the planned chore is not included in a pre-set list of chores, the user can still record the planned chore by using the audio recording unit 326 of the TV 300.

The third embodiment shown in FIG. 3 can be slightly altered to become a fourth embodiment of the present invention. For example, the audio recording unit 326 can be built-inside the remote control 360 rather than be directly connected to the processor 312. A user of the TV 300 can use the audio recording unit 326 built-inside the remote control 360 to record a reminder sound. Recorded audio data corresponding to the reminder sound is generated by the audio recording unit 326 built-inside the remote control 360. Aside from converting the reminder time set by the user into the setting value and then sending the setting value to the receiving interface 322, the remote control 360 can further transmit the recorded audio data generated by the audio recording unit 326 to the receiving interface 322. A more comfortable operational environment is therefore provided to the users of the TV 300. Please note that to transmit the recorded audio data to the receiving interface 322, wireless communication technologies such as Blue Tooth can be adopted by the remote control 360 and the receiving interface 322.

Each of the TVs disclosed in the above mentioned four embodiments differs from prior art TVs in that each disclosed TV reminds its user to perform a certain task by generating a reminder sound. Once the reminder time is reached, even if the user's visual concentration is not focused on the image displayed by the TV, as long as the user can hear the reminder sound generated by the TV, the goal of reminding the user can still be achieved.

Please note that once the reminder time is reached, the processor in each of the above mentioned embodiments can control the reminder sound displaying unit to keep on generating the reminder sound until an arbitrary key or a specific key, which may be located on the remote control, is pressed by the user. This mechanism ensures that the user will certainly hear the reminder sound once the reminder time is reached.

Furthermore, the TV 300 shown in FIG. 3 can have an alternative operation manner. Hence, the TV 300 shown in FIG. 3 can be used to introduce a fifth embodiment of the present invention. In the fifth embodiment, each component has functions similar to that of the corresponding component of the third embodiment. The different between the third and fifth embodiments is that in the fifth embodiment, the processor 312 is capable of performing a voice recognition process. Through the voice recognition process, the processor 312 can recognize the information contained in the recorded audio data. The processor 312 then stores the text data, which corresponds to the information contained in the recorded audio data, into the storage unit 320. Before the reminder time is reached, the processor 312 controls the TV 300 to perform the ordinary Audio/Video displaying processes. Once the reminder time is reached, the processor 312 will control the video displaying unit 314 to display a reminder text according to the textual data stored in the storage unit 320, as well as controlling the TV 300 to perform the ordinary Audio/Video displaying processes. Even if the number of selectable chores preset in the TV 300 is limited, through using the voice recognition function provided by the TV 300, the user can still input their specific planned chore into the TV 300. Once the reminder time is reached, the reminder text will be displayed by the video displaying unit 314, where the reminder text corresponds to what is spoken by the user. Once the TV 300 user sees the reminder text, the goal of reminding the user has been achieved.

The fifth embodiment described above can further be altered to become a sixth embodiment of the present invention. For example, the audio recording unit 326 can be built-inside the remote control 360 rather than be directly connected to the processor 312. The audio recording unit 326 built-inside the remote control 360 records a reminder sound and generates a recorded audio data accordingly. Aside from converting the reminder time set by the user into the setting value and sending the setting value to the receiving interface 322, the remote control 360 can further transmit the recorded audio data generated by the built-in audio recording unit 326 to the receiving interface 322. To transmit the recorded audio data to the receiving interface 322, wireless communication technology such as Blue Tooth can be adopted by the remote control 360 and the receiving interface 322. The processor 312 then voice-recognizes the information contained in the recorded audio data to generate the corresponding text data, and stores the text data into the storage unit 320. Once the reminder time is reached, the processor 312 controls the video displaying unit 314 to additionally display the reminder text according to the textual data stored in the storage unit 320, as well as controlling the TV 300 to perform ordinary Audio/Video displaying processes. Once the TV 300 user sees the reminder text, the goal of reminding the user has been achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A TV capable of performing a reminder function, the TV comprising:
    a reminder sound displaying unit;
    a processor electrically connected to the reminder sound displaying unit, for determining whether a reminder time corresponding to a setting value is reached;
    a receiving interface electrically connected to the processor; and
    a remote control coupled to the receiving interface, the remote control comprising an audio recording unit for recording a reminder sound to generate recorded audio data, the remote control further sending the recorded audio data to the receiving interface,
    wherein the processor controls the reminder sound displaying unit to generate the reminder sound according to the recorded audio data after the reminder time is reached.

2. The TV of claim 1, wherein the reminder sound displaying unit comprises a buzzer.

3. The TV of claim 1, wherein the reminder sound displaying unit comprises a speaker.

4. The TV of claim 3, wherein before the reminder time is reached the processor controls the speaker to generate a program sound, and after the reminder time is reached the processor controls the speaker to generate the reminder sound.

5. The TV of claim 3 further comprising:
    a storage unit electrically connected to the processor, for storing default audio data corresponding to the reminder sound;
    wherein after the reminder time is reached, the processor controls the speaker to generate the reminder sound according to the default audio data.

6. The TV of claim 3 further comprising:
    an audio recording unit electrically connected to the processor, for recording the reminder sound to generate recorded audio data; and
    a storage unit electrically connected to the processor, for storing the recorded audio data;
    wherein after the reminder time is reached, the processor controls the speaker to generate the reminder sound according to the recorded audio data.

7. The TV of claim 3 further comprising:
    a storage unit electrically connected to the processor, for storing the recorded audio data that the receiving interface has received from the remote control,
    wherein the remote control is for generating the setting value and further sending the setting value to the receiving interface,
    wherein after the reminder time is reached, the processor controls the speaker to generate the reminder sound according to the recorded audio data.

8. A TV capable of performing a reminder function, the TV comprising:
    a video displaying unit for displaying a program video;
    an audio recording unit for recording a reminder sound to generate recorded audio data; and
    a processor electrically connected to the video displaying unit and the audio recording unit, for performing voice-recognition on the recorded audio data to generate corresponding textual data, and for controlling the video displaying unit to display reminder text corresponding to the textual data after a reminder time corresponding to a setting value is reached.

9. A TV capable of performing a reminder function, the TV comprising:
    a video displaying unit for displaying a program video;
    a processor electrically connected to the video displaying unit, for performing voice-recognition on recorded audio data to generate corresponding textual data, and for controlling the video displaying unit to display reminder text corresponding to the textual data after a reminder time corresponding to a setting value is reached;
    a receiving interface electrically connected to the processor, for receiving the recorded audio data and the setting value;
    a remote control coupled to the receiving interface, the remote control comprising an audio recording unit for recording a reminder sound to generate the recorded audio data, the remote control further generating the setting value and sending the recorded audio data and the setting value to the receiving interface.

* * * * *